(12) United States Patent
Aoyama et al.

(10) Patent No.: US 7,282,085 B2
(45) Date of Patent: Oct. 16, 2007

(54) APPARATUS FOR HYDROGEN SEPARATION AND FUEL CELL SYSTEM

(75) Inventors: Satoshi Aoyama, Susono (JP); Naoki Ito, Yokohama (JP); Masahiko Iijima, Iruma-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 540 days.

(21) Appl. No.: 10/788,294

(22) Filed: Mar. 1, 2004

(65) Prior Publication Data

US 2005/0014038 A1    Jan. 20, 2005

(30) Foreign Application Priority Data

Mar. 4, 2003   (JP) ............... 2003-056500

(51) Int. Cl.
 *B03C 3/41* (2006.01)
 *H01M 8/04* (2006.01)
 *H01M 2/02* (2006.01)

(52) U.S. Cl. ............... 96/4; 429/17; 429/34
(58) Field of Classification Search ........... 429/12, 429/17, 20, 26, 34; 96/4
 See application file for complete search history.

(56) References Cited

U.S. PATENT DOCUMENTS 6,656,617 B2   12/2003   Aoyama et al. .......... 429/19
7,001,446 B2 *   2/2006   Roark et al. .......... 95/56
2003/0015096 A1   1/2003   Sato et al.

FOREIGN PATENT DOCUMENTS

| DE | 602 03 763 T2 | 3/2006 |
|---|---|---|
| EP | 1 339 125 A2 | 8/2003 |
| JP | A 2001-223017 | 8/2001 |
| JP | A 2001-283885 | 10/2001 |
| JP | A 2002-83617 | 3/2002 |

* cited by examiner

*Primary Examiner*—Dah-Wei Yuan
*Assistant Examiner*—Thomas H. Parsons
(74) *Attorney, Agent, or Firm*—Oliff & Berridge, PLC (57) ABSTRACT

This invention prevents reduction of hydrogen permeability and deterioration in hydrogen separation members that use an oxygen-containing gas as a cathode off gas and a purge gas. Described is a hydrogen separation device that includes a reformed gas passage, a purge gas passage, and a hydrogen separation membrane. A supply of reformed gas flows through the reformed gas passage. A cathode off gas discharged from a fuel cell cathode flows through the purge gas passage to carry hydrogen transmitted through the hydrogen separation membrane to a fuel cell anode. A portion of the hydrogen separation membrane near the supply of the cathode off gas has enhanced heat resistance that prevents deterioration of the hydrogen separation membrane even when hydrogen transmitted through the membrane reacts with oxygen remaining in the cathode off gas to raise the temperature in the vicinity of the portion close to the supply of the cathode off gas.

9 Claims, 8 Drawing Sheets

APPARATUS FOR HYDROGEN SEPARATION AND FUEL CELL SYSTEM

BACKGROUND OF THE INVENTION

1. Technical Field

The present invention relates to a hydrogen separation device that extracts hydrogen from a hydrogen-containing gas, as well as to a fuel cell system.

2. Description of the Related Art

Fuel cells that generate electric power through electrochemical reactions of hydrogen and oxygen have recently gathered attention as the novel energy source. Hydrogen supplied to the fuel cells is obtained, for example, by reforming a hydrocarbon material like methanol to a reformed gas and extracting hydrogen from the reformed gas by means of a hydrogen separation device.

A known structure of the hydrogen separation device uses a hydrogen separation member that is made of, for example, palladium or a palladium alloy and allows selective transmission of hydrogen. In this hydrogen separation device, a supply of the reformed gas is fed to one face of the hydrogen separation member, while hydrogen is extracted from the other face of the hydrogen separation member.

The hydrogen extracted by the hydrogen separation device is carried on a hydrogen carrier gas called a purge gas and is supplied to hydrogen electrodes (anodes) of the fuel cells. The purge gas may be, for example, steam, the remaining reformed gas after separation of hydrogen (non-transmitted gas), or an anode off gas discharged from the hydrogen electrodes of the fuel cells. A cathode off gas discharged from oxygen electrodes (cathodes) of the fuel cells is also applicable to the purge gas, as disclosed in Japanese Patent Laid-Open Gazette No. 2001-283885.

Other techniques relating to separation of hydrogen from the reformed gas are also disclosed in Japanese Patent Laid-Open Gazette No. 2002-83617 and No. 2001-223017. The former technique releases steam from the anode off gas of fuel cells and utilizes the released steam as the purge gas. The latter technique supplies steam to a hydrogen separation unit to lower the hydrogen partial pressure and thereby enhance the hydrogen separation efficiency.

In the case of using the cathode off gas as the purge gas, it should be noted that the cathode off gas may contain unreacted oxygen, which has not been consumed in the fuel cells. When oxygen remains in the purge gas, a reaction of hydrogen with oxygen may proceed in the hydrogen separation device. Its reaction heat may interfere with the sufficient hydrogen permeation of the hydrogen separation member. The reaction may also deteriorate the hydrogen separation member.

The object of the invention is thus to prevent reduction of hydrogen permeability and deterioration of a hydrogen separation member in a hydrogen separation device that uses a cathode off gas as a purge gas.

SUMMARY OF THE INVENTION

In order to attain at least part of the above and the other related objects, the present invention is directed to a hydrogen separation device that extracts hydrogen from a hydrogen-containing gas. The hydrogen separation device includes: a hydrogen separation member that has a first face and a second face and allows hydrogen transmit from the first face to second face selectively; a hydrogen-containing gas supply module that feeds a supply of the hydrogen-containing gas to the first face; a carrier gas flow path that makes a carrier gas, which carries the hydrogen transmitted to the second face to outside of the hydrogen separation device, flow to be in contact with the second face; and a supply module that makes a supply of the carrier gas containing oxygen flow through the carrier gas flow path. A specific section of the hydrogen separation member close to the supply module has a structure of higher heat resistance than that of another section of the hydrogen separation member.

When the oxygen-containing carrier gas is supplied to the hydrogen separation device, a reaction of hydrogen with oxygen mainly proceeds in the vicinity of the supply module of the carrier gas. In the hydrogen separation device of the above structure, the specific section of the hydrogen separation member close to the supply module has excellent heat resistance. This arrangement effectively prevents deterioration of the performance of the hydrogen separation device due to the reaction heat. The structure of higher heat resistance may be a structure of preventing heat-inducing deterioration or a structure of preventing heat-inducing decrease in hydrogen permeability.

In one preferable arrangement of the hydrogen separation device of the invention, the hydrogen separation member has an oxidation catalyst arranged in a vicinity of the specific section. This structure accelerates the reaction of hydrogen with oxygen in the vicinity of the specific section of the hydrogen separation member and effectively prevents the adverse effects of heat on another section of the hydrogen separation member.

The hydrogen separation device may have a heat source that is arranged in a vicinity of the specific section of the hydrogen separation member to heat up the carrier gas. This structure heats up the low-temperature carrier gas to accelerate the reaction of hydrogen with oxygen.

The hydrogen separation device may have a radiator mechanism that is arranged in a vicinity of the specific section of the hydrogen separation member. This structure ensures radiation of excess reaction heat, thus preventing the specific section of the hydrogen separation member from being heated excessively.

It is preferable that the specific section of the hydrogen separation member is made of palladium or a palladium alloy, since palladium or the palladium alloy ensures stable transmission of hydrogen even at high temperatures.

In one preferable embodiment of the invention, the hydrogen separation member has a base material of a group V metal or a group V metal-containing alloy and a layer of palladium or a palladium alloy on at least one side of the base material. The layer of palladium or the palladium alloy in the specific section of the hydrogen separation member is thicker than the layer of palladium or the palladium alloy in another section of the hydrogen separation member.

In the hydrogen separation member including two metals in a layered structure, diffusion of the two metals generally occurs under application of heat. Such diffusion may lower the hydrogen permeability. The thicker palladium (palladium alloy) layer in the specific section of the hydrogen separation member close to the supply module of the carrier gas than another section effectively prevents diffusion of the metals and thereby a decrease in hydrogen permeability in the vicinity of the specific section of the hydrogen separation member. The group V metal may be, for example, vanadium, niobium, or tantalum.

In another preferable embodiment of the invention, the hydrogen separation member has a base material of a group V metal or a group V metal-containing alloy and a layer of palladium or a palladium alloy on at least one side of the base material. The specific section of the hydrogen separation member has a diffusion control layer arranged between the base material of the group V metal or the group V metal-containing alloy and the layer of palladium or the palladium alloy to prevent diffusion of different metals.

This structure effectively prevents diffusion between the respective layers and thereby deterioration of hydrogen permeability. The diffusion control layer may be made of a metal thin film like nickel or cobalt or a ceramic film.

The present invention is also directed to a hydrogen separation device that extracts hydrogen from a hydrogen-containing gas. The hydrogen separation device includes: a hydrogen separation member that has a first face and a second face and allows hydrogen transmit from the first face to second face selectively; a hydrogen-containing gas supply module that feeds a supply of the hydrogen-containing gas to the first face; a carrier gas flow path that makes a carrier gas, which carries the hydrogen transmitted to the second face to outside of the hydrogen separation device, flow to be in contact with the second face; and a supply module that makes a supply of the carrier gas containing oxygen flow through the carrier gas flow path. A specific section of the hydrogen separation member close to the supply module has a structure of more excellent hydrogen embrittlement resistance than that of another section of the hydrogen separation member.

A metal containing hydrogen of or over a preset concentration generally has hydrogen brittleness and easily deteriorates at lower temperatures. The prior art technique accordingly preheats the carrier gas to discharge absorbed hydrogen. In the hydrogen separation device of this structure, however, the specific section of the hydrogen separation member close to the supply module of the oxygen-containing carrier gas has excellent hydrogen embrittlement resistance. This does not require preheating of the carrier gas and thus desirably simplifies the structure of the whole hydrogen separation device. In one embodiment of this structure, the specific section of the hydrogen separation member is made of a palladium alloy or a vanadium alloy having a lower content of a group V metal than the other section(s) of the hydrogen separation member.

The present invention is further directed to a hydrogen separation device that extracts hydrogen from a hydrogen-containing gas. The hydrogen separation device includes: a hydrogen separation member that has a first face and a second face and allows hydrogen transmit from the first face to second face selectively; a hydrogen-containing gas supply module that feeds a supply of the hydrogen-containing gas to the first face; a carrier gas flow path that makes a carrier gas, which carries the hydrogen transmitted to the second face to outside of the hydrogen separation device, flow to be in contact with the second face; and a supply module that makes a supply of the carrier gas containing oxygen flow through the carrier gas flow path. A specific section of the hydrogen separation member close to the supply module has a structure of lower hydrogen permeability than that of another section of the hydrogen separation member.

This structure reduces the quantity of hydrogen transmitted through the specific section of the hydrogen separation member close to the supply module of the carrier gas, compared with another section of the hydrogen separation member. This ensures the gentle reaction of hydrogen with oxygen and thus effectively prevents deterioration of the hydrogen separation member due to a local temperature rise.

The present invention is also directed to a hydrogen separation device that extracts hydrogen from a hydrogen-containing gas. The hydrogen separation device includes: a hydrogen separation member that has a first face and a second face and allows hydrogen transmit from the first face to second face selectively; a hydrogen-containing gas supply module that feeds a supply of the hydrogen-containing gas to the first face; a carrier gas flow path that makes a carrier gas, which carries the hydrogen transmitted to the second face to outside of the hydrogen separation device, flow to be in contact with the second face; and a supply module that makes a supply of the carrier gas containing oxygen flow through the carrier gas flow path. Here the supply module has multiple supply ports to the carrier gas flow path.

This structure enables divisional flows of the oxygen-containing carrier gas to be supplied to the second face of the hydrogen separation member, thus effectively preventing any local reaction of hydrogen with oxygen.

Any of the arrangements discussed above may be appropriately combined or partly omitted according to the requirements.

Another application of the present invention is a fuel cell system, which includes: fuel cells that utilize a supply of hydrogen to anodes and a supply of oxygen to cathodes to generate electric power; and a hydrogen separation device that extracts hydrogen from a hydrogen-containing gas and supplies the extracted hydrogen to the fuel cells.

The fuel cells have a cathode off gas exhaust port for discharging a cathode off gas. The hydrogen separation device includes: a hydrogen separation member that has a first face and a second face and allows hydrogen transmit from the first face to second face selectively; a hydrogen-containing gas supply module that feeds a supply of the hydrogen-containing gas to the first face; a carrier gas flow path that makes a carrier gas, which carries the hydrogen transmitted to the second face to outside of the hydrogen separation device, flow to be in contact with the second face; and a supply module that is connected to the cathode off gas port of the fuel cells to supply the cathode off gas to the carrier gas flow path. A specific section of the hydrogen separation member close to the supply module has a structure of at least one of higher heat resistance, more excellent hydrogen embrittlement, and lower hydrogen permeability than that of another section of the hydrogen separation member.

The carrier gas used in the hydrogen separation device may be the cathode off gas, which is discharged from the fuel cells that utilize a supply of hydrogen to anodes and a supply of oxygen to cathodes to generate electric power. This ensures efficient use of the valuable resources in the fuel cell system.

DESCRIPTION OF THE PREFERRED EMBODIMENTS

Figure 1:
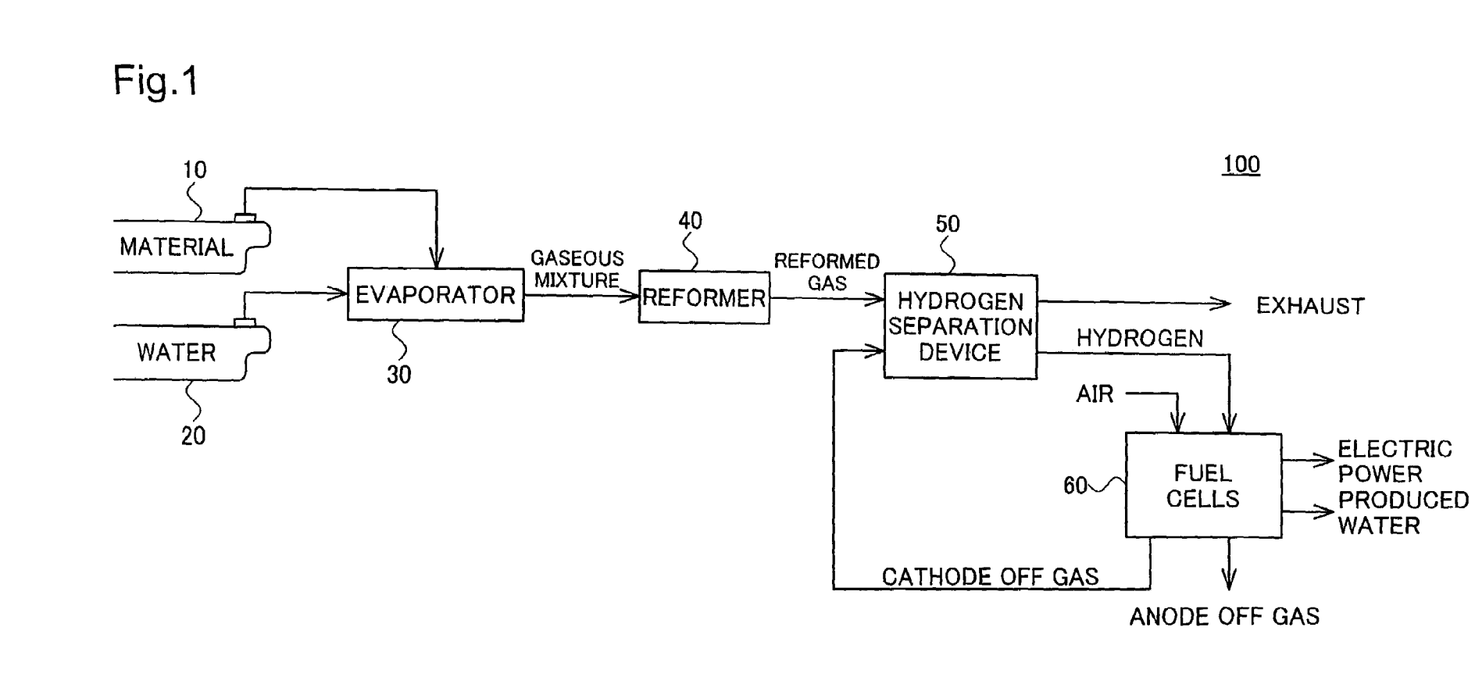
FIG. 1 schematically illustrates the general configuration of a fuel cell system including a hydrogen separation device in one embodiment.

One mode of carrying out the invention is discussed below as a preferred embodiment in the following sequence:
  A. General Configuration of Fuel Cell System
  B. Hydrogen Separation Device
  C. Hydrogen Separation Membrane
  D. Other Structures of Hydrogen Separation Device
  E. Modification A. General Configuration of Fuel Cell System FIG. 1 schematically illustrates the general configuration of a fuel cell system 100 including a hydrogen separation device 50 in one embodiment. The fuel cell system 100 includes, as its primary constituents, a material tank 10 that stores a material as a generation source of hydrogen, a water tank 20 that stores water, an evaporator 30 that evaporates and mixes the material and water to produce a gaseous mixture, a reformer 40 that reforms the gaseous mixture to produce a reformed gas, the hydrogen separation device 50 that extracts and separates hydrogen from the reformed gas, and a stack of fuel cells 60 that generates electric power through electrochemical reactions of hydrogen with oxygen.

The material stored in the material tank 10 is subjected to a reforming reaction proceeding in the reformer 40. The material may be any of liquid hydrocarbons like gasoline, alcohols like methanol, aldehydes, natural gas, and a diversity of other hydrocarbon materials to produce hydrogen through reforming reactions. The evaporator 30 heats up and vaporizes the supply of material from the material tank 10 and the supply of water from the water tank 20, mixes the vaporized material and water to produce a gaseous mixture, and feeds a supply of the gaseous mixture to the reformer 40.

The gaseous mixture of the material and water produced by the evaporator 30 goes through the reforming reaction in the reformer 40 to be converted to a hydrogen-containing reformed gas. The reformer 40 includes a catalyst suitably selected for the material. The reforming reaction proceeding in the reformer 40 may be selected appropriately, for example, a steam reforming reaction, a partial oxidation reaction, or a combination thereof.

The hydrogen separation device 50 receives a supply of the reformed gas from the reformer 40 and separates and extracts hydrogen from the reformed gas. The extracted hydrogen is fed as a fuel gas to anodes in the stack of fuel cells 60. The air compressed by a blower or any equivalent means is fed as an oxidizing gas to cathodes in the stack of fuel cells 60. The fuel cells 60 receive the supplies of the fuel gas and the oxidizing gas and generate electric power through electrochemical reactions of the fuel gas and the oxidizing gas.

Any of the diverse materials mentioned above may be applied to generate hydrogen. The structure of the fuel cell system 100 shown in FIG. 1 is thus modified appropriately according to the selected material. For example, when the selected material contains sulfur, a desulfurizer is located before the evaporator 30 to desulfur the material. A device of reducing the concentration of carbon monoxide included in the reformed gas by a shift reaction may be arranged between the reformer 40 and the hydrogen separation device 50.

B. Hydrogen Separation Device

Figure 2:
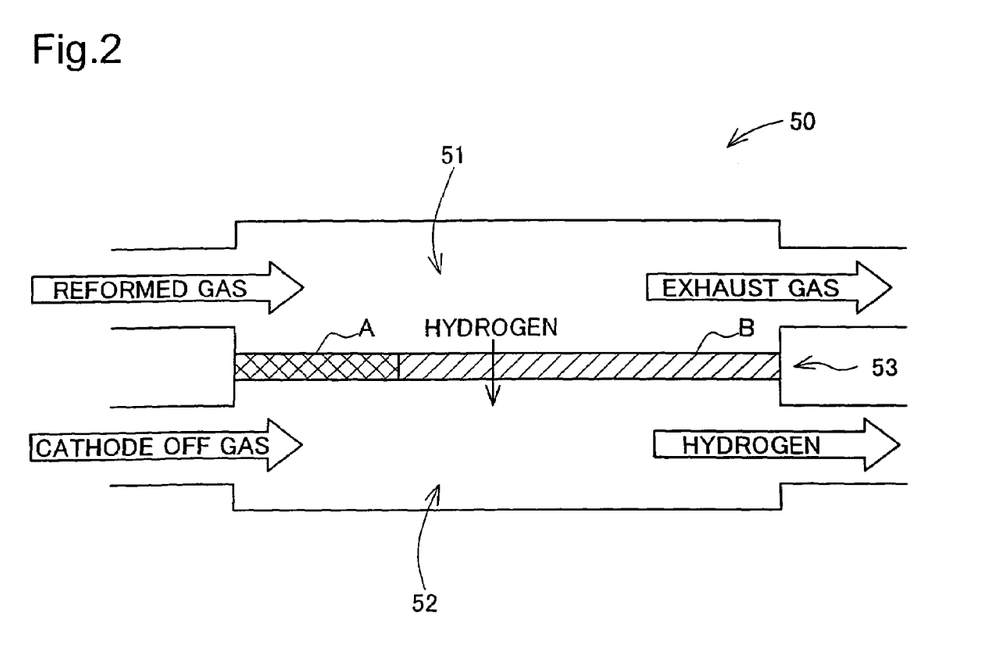
FIG. 2 schematically illustrates the structure of a hydrogen separation device 50.

FIG. 2 schematically illustrates the structure of the hydrogen separation device 50. The hydrogen separation device 50 includes a reformed gas passage 51, a purge gas passage 52, and a hydrogen separation membrane 53.

The supply of the reformed gas from the reformer 40 flows through the reformed gas passage 51. The reformed gas contains hydrogen and carbon dioxide. The function of the hydrogen separation membrane 53 allows selective transmission of hydrogen included in the reformed gas to the purge gas passage 52. The remaining gas including carbon dioxide is discharged as an exhaust gas from the reformed gas passage 51.

A purge gas is made to flow through the purge gas passage 52. The purge gas functions as a carrier gas to carry hydrogen transmitted through the hydrogen separation membrane 53 to the anodes in the fuel cells 60. In the illustrated example of FIG. 2, the feeding direction of the reformed gas is identical with the flowing direction of the purge gas. The flow of the purge gas may otherwise be reverse to the flow of the reformed gas. In the structure of this embodiment, a cathode off gas discharged from the cathodes of the fuel cells 60 is used as the purge gas, as shown in FIG. 1. The hydrogen transmitted through the hydrogen separation membrane 53 is carried on the cathode off gas to the anodes in the fuel cells 60 to be used as the fuel gas.

The hydrogen separation membrane 53 has different structures in a section close to the supply of the cathode off gas (expressed by A in the drawing: hereafter referred to as section A) and in a remaining section (expressed by B in the drawing: hereafter referred to as section B). This dual structure is adopted to enhance the heat resistance in the section of the hydrogen separation membrane 53 close to the supply of the cathode off gas. The cathode off gas may include unreacted oxygen, which is not used in the fuel cells 60. The hydrogen transmitted through the hydrogen separation membrane 53 may react with the unreacted oxygen for combustion in the section A to locally heat up the section A. As the countermeasure against such locally raised temperature, the fuel cell system 100 of the embodiment adopts the hydrogen separation membrane and the hydrogen separation device having any of diverse structures discussed above.

C. Hydrogen Separation Membrane

Figure 3:
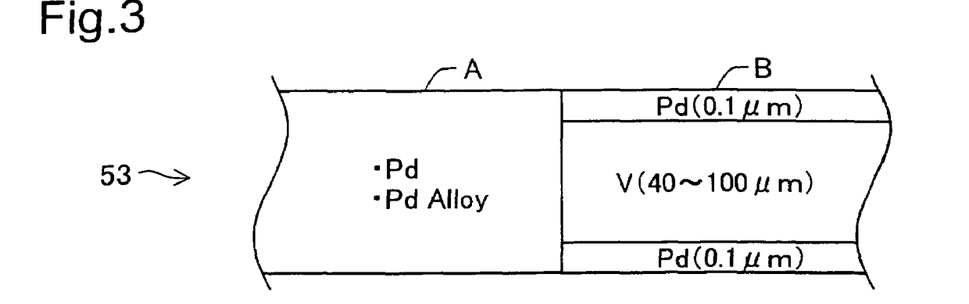
FIG. 3 schematically illustrates the structure of a hydrogen separation membrane 53 including a section close to a supply of cathode off gas, which is made of palladium Pd or a palladium alloy.

The following describes several heat-resistant structures applicable to the hydrogen separation membrane of the embodiment. FIG. 3 schematically illustrates the structure of the hydrogen separation membrane 53 including the section A of palladium (Pd) or a palladium alloy. The hydrogen separation membrane generally has a sandwich structure including a base material of a group V metal like vanadium (V) or a vanadium alloy and palladium Pd or palladium alloy coats on both faces thereof. The section B shown in FIG. 3 has this sandwich structure. The section A of the hydrogen separation membrane 53 shown in FIG. 3 does not have this sandwich structure but is simply composed of palladium Pd or a palladium alloy. These metals ensure stable transmission of hydrogen even at high temperatures. The hydrogen separation membrane of this structure does not cause diffusion of palladium Pd and vanadium V and thus does not significantly lower the hydrogen permeability, even when the unreacted oxygen remaining in the supply of the cathode off gas reacts with hydrogen to locally heat up the section A. The section A of the palladium alloy has excellent hydrogen embrittlement resistance at low temperatures and accordingly does not deteriorate even under the condition of the low-temperature cathode off gas, for example, at the time of activation of the fuel cells 60. A vanadium V alloy having a lower vanadium V content than the base material of the section B may be used as the base material of the section A. This also gives the excellent hydrogen embrittlement resistance. Only a single face of the vanadium V base material may be coated with palladium Pd or the palladium alloy. The layer of palladium Pd or palladium alloy may not be a coated layer. A metal foil of palladium Pd or palladium alloy may be stuck to at least one side of the base material.

Figure 4:
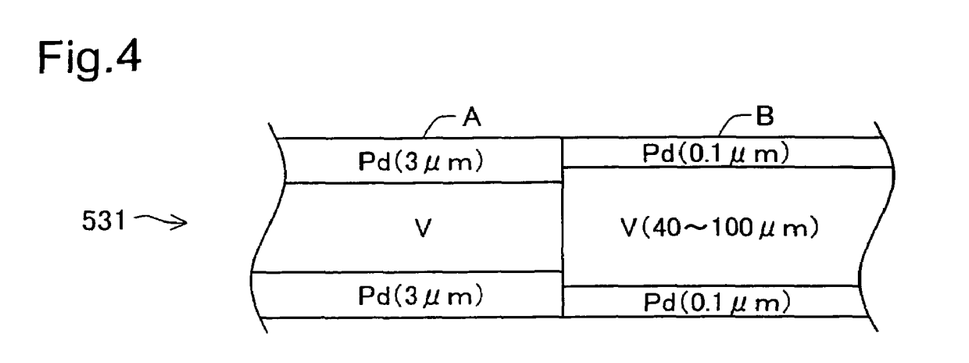
FIG. 4 schematically illustrates the structure of another hydrogen separation membrane 531 having thicker palladium Pd coats in the section close to the supply of cathode off gas than those in another section.

FIG. 4 schematically illustrates the structure of another hydrogen separation membrane 531. The section A of the hydrogen separation membrane 531 shown in FIG. 4 has a vanadium V base material with palladium Pd coats on both faces thereof. The palladium Pd coat in the section A is thicker than the palladium Pd coat in the section B. In this illustrated example, the palladium Pd coat of the section B is 0.1 μm, while the palladium Pd coat of the section A is approximately 3 μm. Such large thickness effectively prevents the occurrence of diffusion at locally raised temperatures and thus ensures stable hydrogen separation even at high temperatures. Vanadium V has the greater permeability of hydrogen than palladium Pd. The amount of hydrogen transmission in the section B is thus greater than the amount of hydrogen transmission in the section A. This structure accordingly prevents the local combustion reaction in the vicinity of the section A and attains a moderate temperature distribution. The thickness of the coat in the section A may be in a range of 1 μm to 10 μm.

Figure 5:
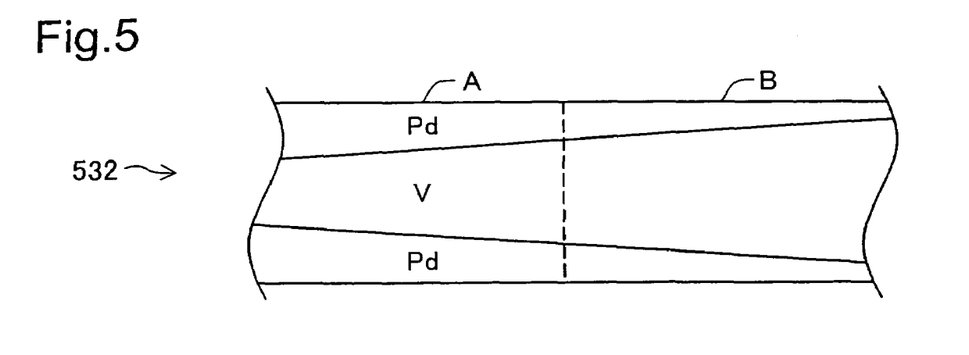
FIG. 5 schematically illustrates the structure of still another hydrogen separation membrane 532 having palladium Pd coats of gradually varying thickness from the section close to the supply of cathode off gas to a remaining section.

FIG. 5 schematically illustrates the structure of still another hydrogen separation membrane 532. Both the section A and section B of the hydrogen separation membrane 532 shown in FIG. 5 have palladium Pd coats on both faces of a vanadium V base material. The thickness of the palladium Pd coat gradually varies. This structure effectively prevents the occurrence of diffusion at raised temperatures and thus ensures stable hydrogen separation even at high temperatures, like the structure of FIG. 4.

Figure 6:
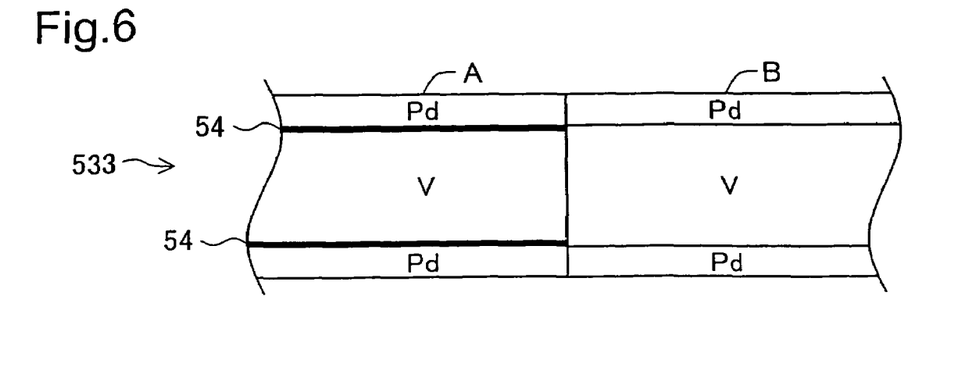
FIG. 6 schematically illustrates the structure of another hydrogen separation membrane 533 having diffusion control layers 54 between palladium Pd coats and a vanadium V base material in the section close to the supply of cathode off gas.

FIG. 6 schematically illustrates the structure of another hydrogen separation membrane 533, which has diffusion control layers 54 arranged between a vanadium V base material and palladium Pd coats in the section A. A metal thin film like nickel or cobalt thin film or a ceramic film may be used for the diffusion control layer 54. This structure effectively prevents the occurrence of diffusion of palladium Pd and vanadium V.

The hydrogen separation membrane is not restricted to the above structures but may have any of other diverse structures. For example, the section A may be a ceramic porous base material coated with Pd. This structure is desirably free from the metal diffusion phenomenon.

Any of the structures discussed above effectively enhances the heat resistance in the section of the hydrogen separation membrane close to the supply of the cathode off gas.

D. Other Structures of Hydrogen Separation Device

Figure 7:
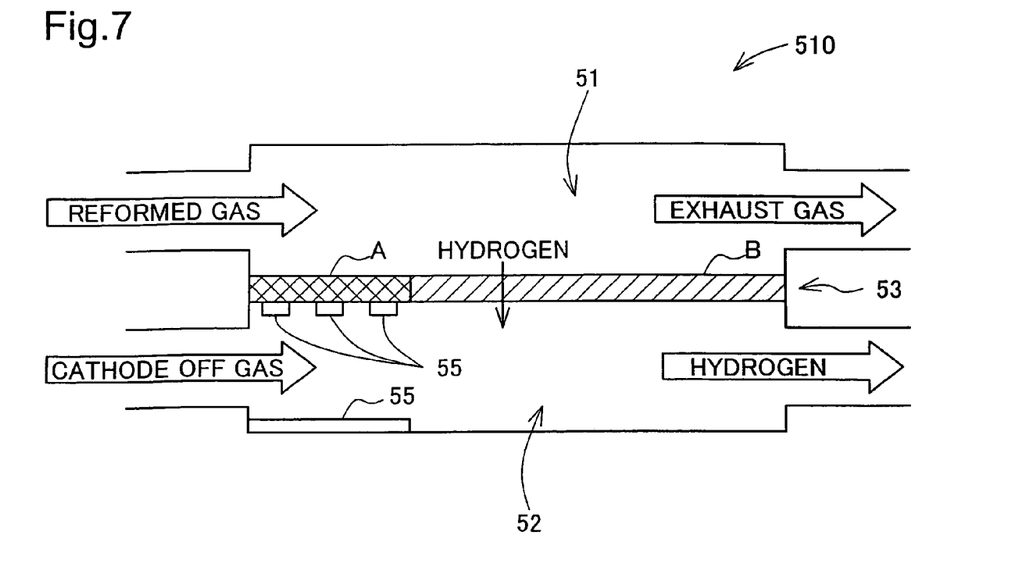
FIG. 7 schematically illustrates the structure of another hydrogen separation device 510 having an oxidation catalyst 55 arranged in the vicinity of the section close to the supply of cathode off gas.
Figure 8:
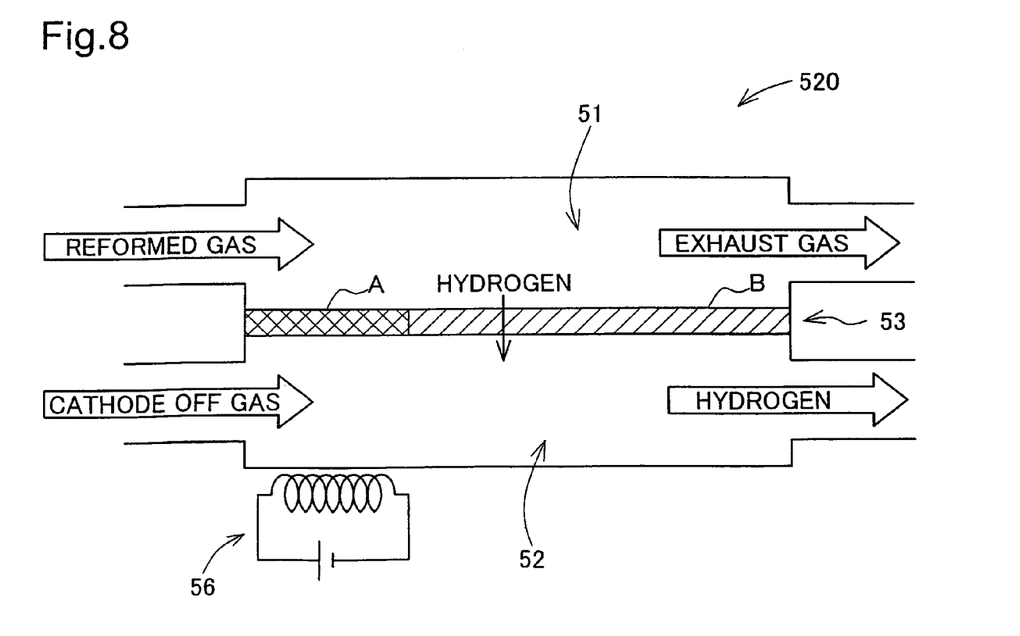
FIG. 8 schematically illustrates the structure of still another hydrogen separation device 520 having a heat source 56 located in the vicinity of the section close to the supply of cathode off gas.

When the hydrogen separation membrane has any of the above heat-resistant structures, it is desirable to positively make oxygen react with hydrogen in the vicinity of the section A. Consumption of all or most of oxygen included in the cathode off gas in the vicinity of the section A effectively reduces the oxidation reaction in the vicinity of the section B. This prevents a local temperature rise in the vicinity of the section B and thus keeps the durability of the section B at a sufficiently high level. FIGS. 7 and 8 show available structures of the hydrogen separation device to positively accelerate the oxidation reaction of hydrogen in the vicinity of the section A.

FIG. 7 schematically illustrates the structure of another hydrogen separation device 510 having an oxidation catalyst 55 arranged in the vicinity of the section A. The oxidation catalyst may be platinum. In the hydrogen separation device 510 of this structure, hydrogen and oxygen positively react with each other in the vicinity of the section A. FIG. 8 schematically illustrates the structure of still another hydrogen separation device 520 having a heat source 56 located in the vicinity of the section A. The heat source 56 pre-heats the cathode off gas. The oxygen remaining in the cathode off gas then actively reacts with hydrogen.

Figure 9:
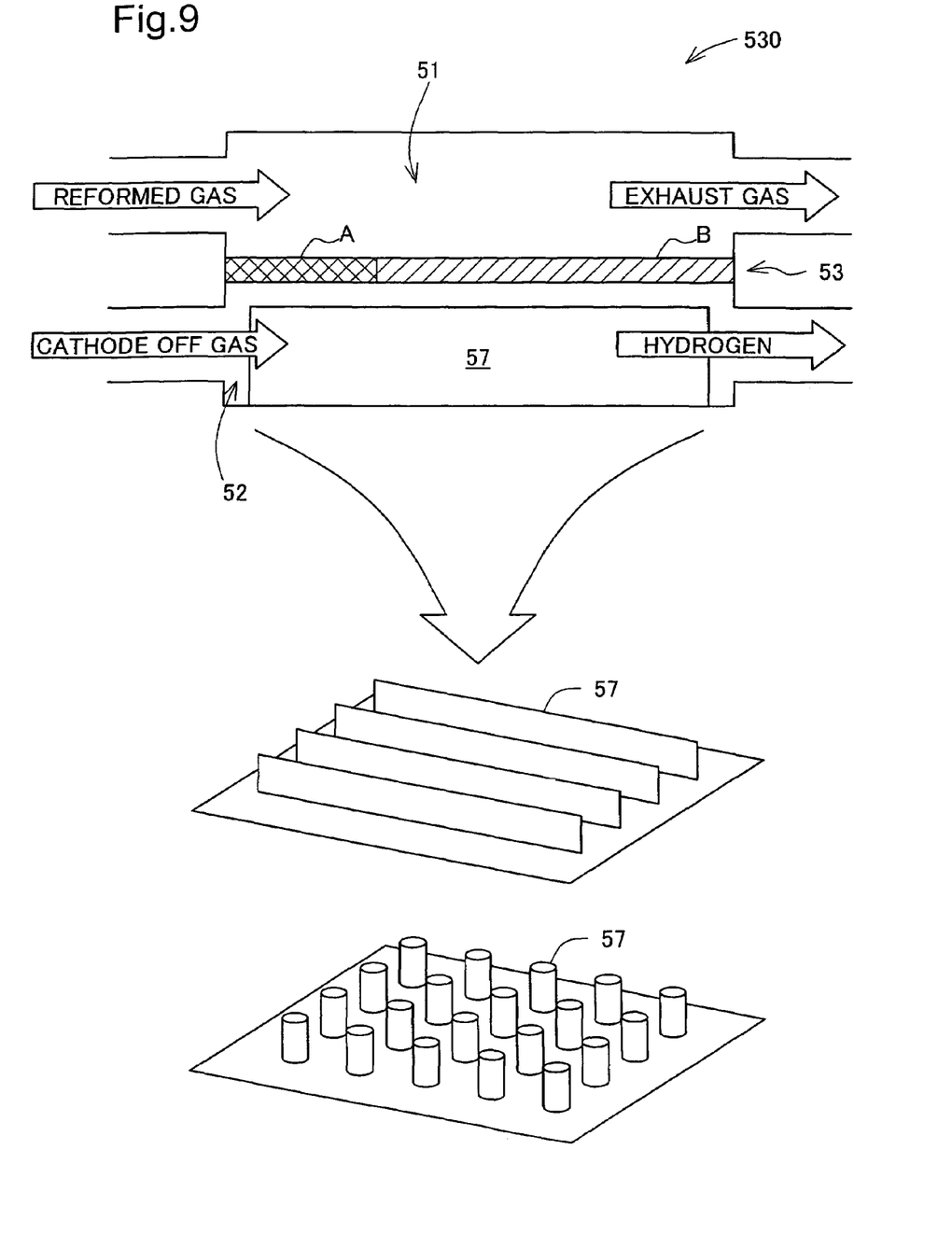
FIG. 9 schematically illustrates the structure of another hydrogen separation device 530 having a radiator mechanism 57 located in the vicinity of the section close to the supply of cathode off gas.

A radiator mechanism may be provided in the vicinity of the section A. FIG. 9 schematically illustrates the structure of another hydrogen separation device 530 having a radiator mechanism 57 located in the vicinity of the section A. This structure efficiently releases heat produced by the oxidation reaction in the vicinity of the section A. The radiator mechanism may have a large number of fins or columns located in the purge gas passage 52, as illustrated. The fins or columns are made of a metal having good heat conductivity, such as aluminum or copper. The radiator mechanism may otherwise have a heat pipe or any other suitable structure for efficient heat radiation. In the structure of FIG. 9, the radiator mechanism is arranged along the section B as well as the section A. The radiator mechanism may, however, be located only in the vicinity of the section A. This structure effectively prevents an extreme temperature rise in the vicinity of the section A, even when the oxygen remaining in the cathode off gas actively reacts with hydrogen in the vicinity of the section A.

The embodiment discussed above is to be considered in all aspects as illustrative and not restrictive. There may be many modifications, changes, and alterations without departing from the scope or spirit of the main characteristics of the present invention. Some examples of possible modification are given below.

Figure 10:
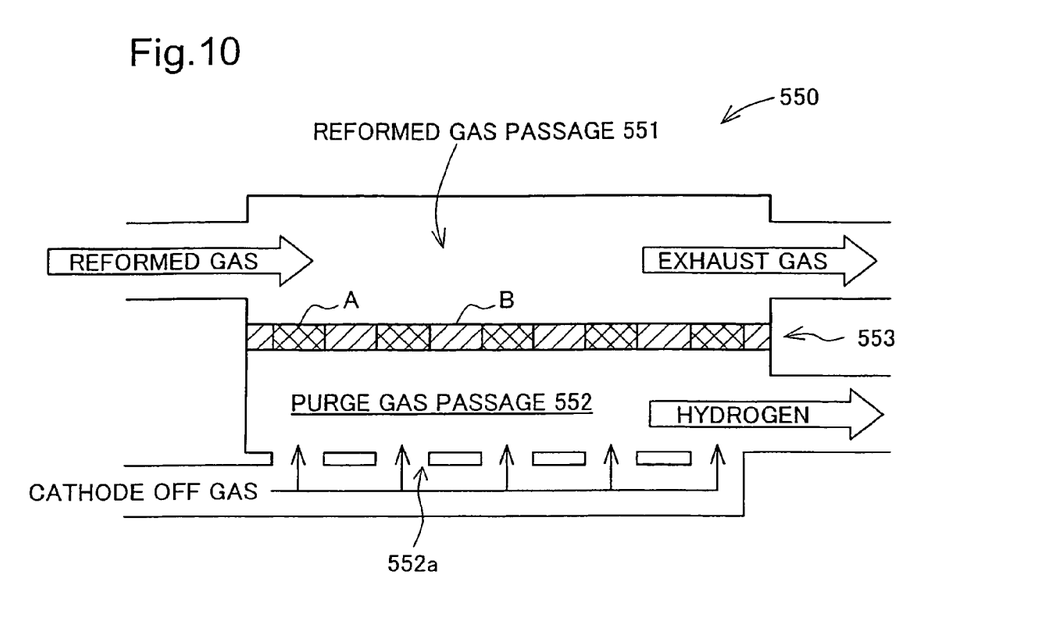
FIG. 10 schematically illustrates the structure of still another hydrogen separation device 550, where divisional flows of the cathode off gas are supplied to a purge gas passage.

E. Modification (1) FIG. 10 schematically illustrates the structure of another hydrogen separation device 550, where divisional flows of the cathode off gas are supplied to a purge gas passage. A purge gas passage 552 has multiple apertures 552a, through which the cathode off gas flows in. This structure attains dispersion of the combustion reaction in the purge gas passage 552 and thereby prevents a local temperature rise in a hydrogen separation membrane 553. The hydrogen separation membrane may have a single structure of a vanadium V base material with palladium Pd coats on both faces thereof. In the illustrated example, however, the hydrogen separation membrane 553 applies any of the above heat-resistant structures to sites (sections A) corresponding to the apertures 552a, through which the cathode off gas flows in.

Figure 11:
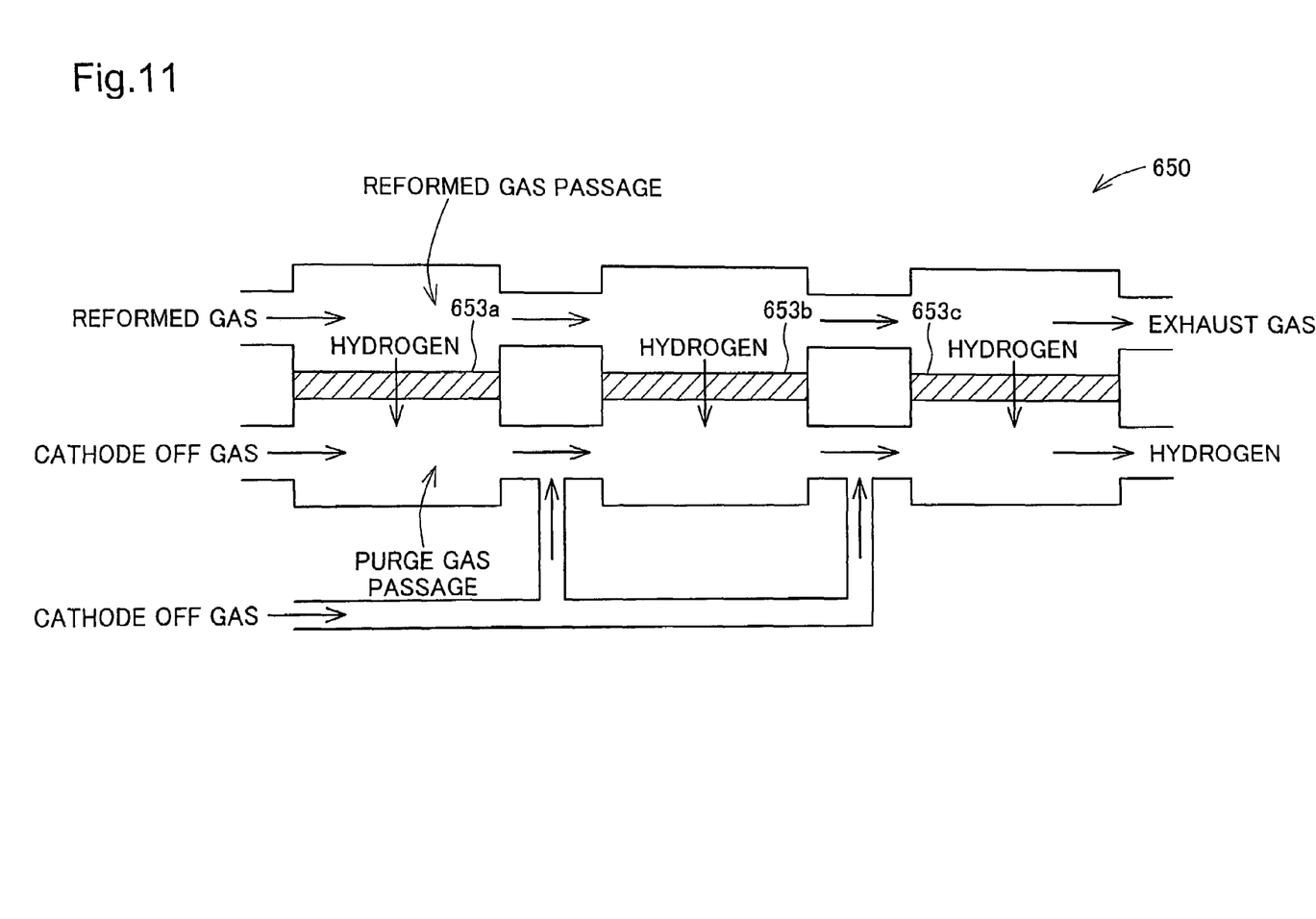
FIG. 11 schematically illustrates the structure of another hydrogen separation device 650, where divisional flows of the cathode off gas are supplied to a purge gas passage.

(2) FIG. 11 schematically illustrates the structure of still another hydrogen separation device 650, where the flow path of the cathode off gas is branched to supply divisional flows to a purge gas passage. In this illustrated examples, multiple hydrogen separation membranes 653a through 653c are arranged in series and respectively receive divisional flows of the cathode off gas. This structure reduces the flow rate of the cathode off gas at each location and thereby prevents a local temperature rise in any of the hydrogen separation membranes 653a through 653c. Each of the hydrogen separation membranes 653a through 653c may apply any of the above heat-resistant structures to each section close to the supply of the cathode off gas.

Figure 12:
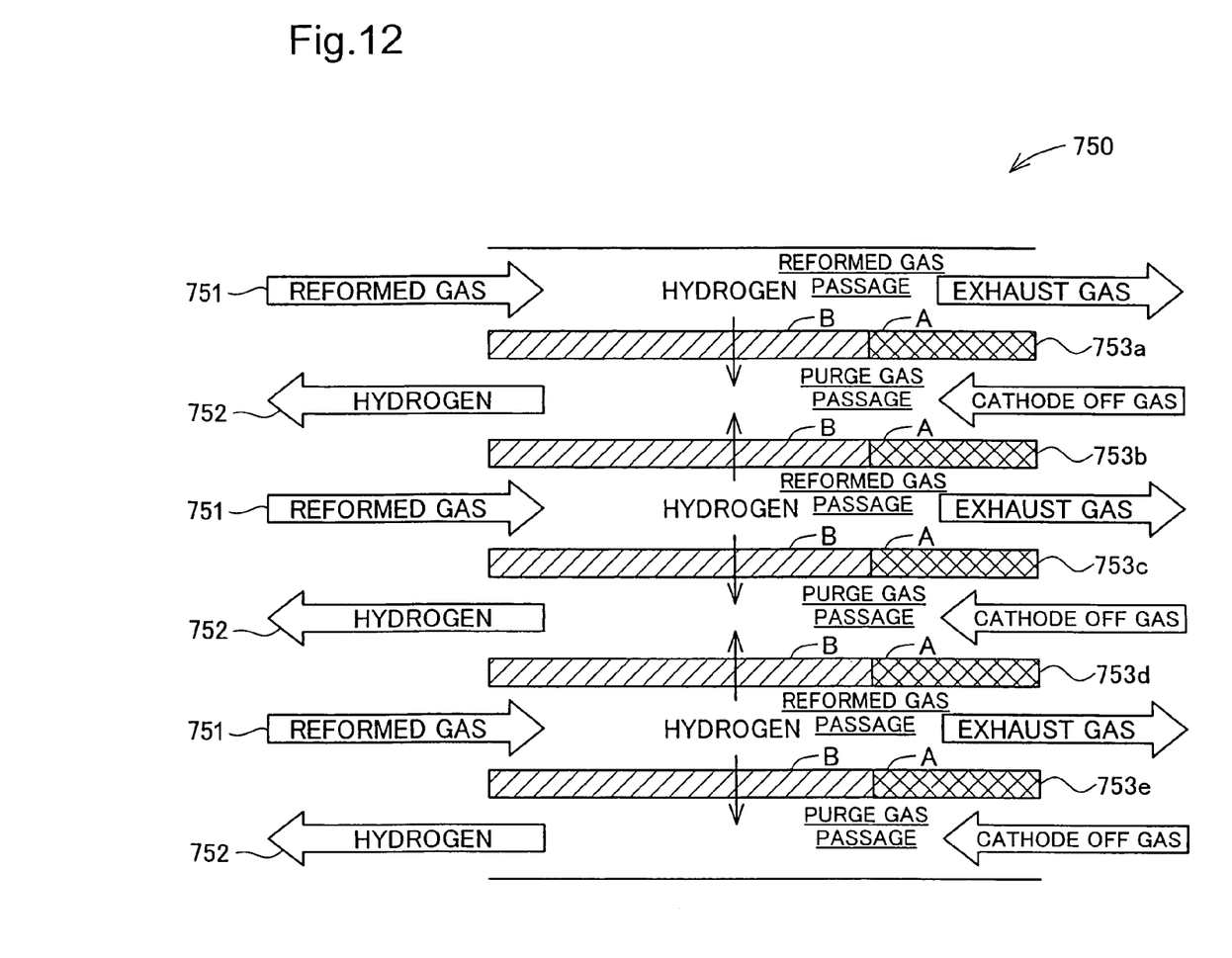
FIG. 12 schematically illustrates the structure of still another hydrogen separation device 750 having multiple hydrogen separation membranes in a layered structure.

(3) FIG. 12 schematically illustrates the structure of still another hydrogen separation device 750 having a number of hydrogen separation membranes in a layered structure. In this illustrated example, adjoining pairs of multiple hydrogen separation membranes 753a through 753e arranged in a layered structure alternately form reformed gas passages 751 and purge gas passages 752. The flow of the hydrogen-containing reformed gas is reverse to the flow of the cathode off gas as the purge gas. This structure enables hydrogen to be transmitted through the hydrogen separation membranes 753 on both sides to each purge gas conduit 752, thus ensuring efficient hydrogen separation. Divisional flows of the cathode off gas are supplied to the respective purge gas passages. This structure reduces the flow rate of the cathode off gas at each location and thereby prevents a local temperature rise. Each of the hydrogen separation membranes may apply any of the above heat-resistant structures to each section close to the supply of the cathode off gas. The example of FIG. 12 has the five-layered hydrogen separation membranes 753a through 753e, although the number of layers may be six or greater or two to four.

(4) In the embodiment discussed above, the cathode off gas discharged from the fuel cells 60 is used as the purge gas. The hydrogen separation device may be incorporated in a system other than the fuel cell system. The structure of the hydrogen separation device of the invention is extremely useful when the cathode off gas or any other oxygen-containing gas is applied to the purge gas.

All changes within the meaning and range of equivalency of the claims are intended to be embraced therein. The scope and spirit of the present invention are indicated by the appended claims, rather than by the foregoing description.

What is claimed is:

1. A hydrogen separation device that extracts hydrogen from a hydrogen-containing gas, said hydrogen separation device comprising:

a hydrogen separation member that has a first face and a second face and makes hydrogen transmit from the first face to the second face selectively;

a hydrogen-containing gas supply module that feeds a supply of the hydrogen-containing gas to the first face;

a carrier gas flow path that makes a carrier gas, which carries the hydrogen transmitted to the second face to outside of said hydrogen separation device, flow to be in contact with the second face; and a supply module that makes a supply of the carrier gas containing oxygen flow through said carrier gas flow path, wherein a specific section of said hydrogen separation member close to said supply module, and not occupying the entire first or second face of said hydrogen separation member, has a structure of higher heat resistance than that of another section of said hydrogen separation member.

2. A hydrogen separation device in accordance with claim 1, wherein the carrier gas is a cathode off gas discharged from fuel cells, which utilize a supply of hydrogen to anodes and a supply of oxygen to cathodes to generate electric power.

3. A hydrogen separation device in accordance with claim 1, wherein said hydrogen separation member has an oxidation catalyst arranged in a vicinity of the specific section.

4. A hydrogen separation device in accordance with claim 1, said hydrogen separation device further comprising a heat source that is arranged in a vicinity of the specific section of said hydrogen separation member to heat up the carrier gas.

5. A hydrogen separation device in accordance with claim 1, said hydrogen separation device further comprising a radiator mechanism that is arranged in a vicinity of the specific section of said hydrogen separation member.

6. A hydrogen separation device in accordance with claim 1, wherein the specific section of said hydrogen separation member is made of palladium or a palladium alloy.

7. A hydrogen separation device in accordance with claim 1, wherein said hydrogen separation member has a base material of a group V metal or a group V metal-containing alloy and a layer of palladium or a palladium alloy on at least one side of the base material, and the layer of palladium or the palladium alloy in the specific section of said hydrogen separation member is thicker than the layer of palladium or the palladium alloy in another section of said hydrogen separation member.

8. A hydrogen separation device in accordance with claim 1, wherein said hydrogen separation member has a base material of a group V metal or a group V metal-containing alloy and a layer of palladium or a palladium alloy on at least one side of the base material, and the specific section of said hydrogen separation member has a diffusion control layer arranged between the base material of the group V metal or the group V metal-containing alloy and the layer of palladium or the palladium alloy to prevent diffusion of different metals.

9. A fuel cell system, comprising:

fuel cells that utilize a supply of hydrogen to anodes and a supply of oxygen to cathodes to generate electric power; and a hydrogen separation device that extracts hydrogen from a hydrogen-containing gas and supplies the extracted hydrogen to said fuel cells, said fuel cells having a cathode off gas exhaust port for discharging a cathode off gas, said hydrogen separation device comprising:

a hydrogen separation member that has a first face and a second face and makes hydrogen transmit from the first face to the second face selectively;

a hydrogen-containing gas supply module that feeds a supply of the hydrogen-containing gas to the first face;

a carrier gas flow path that makes a carrier gas, which carries the hydrogen transmitted to the second face to outside of said hydrogen separation device, flow to be in contact with the second face; and a supply module that is connected to the cathode off gas port of said fuel cells to supply the cathode off gas to said carrier gas flow path, wherein a specific section of said hydrogen separation member close to said supply module, and not occupying the entire first or second face of said hydrogen separation member, has a structure of higher heat resistance than that of another section of said hydrogen separation member.

* * * * *